(12) United States Patent
Makhdoom

(10) Patent No.: US 11,548,434 B2
(45) Date of Patent: Jan. 10, 2023

(54) AUTOMOBILE SAFETY LIGHT SYSTEM AND METHODS OF USE

(71) Applicant: Masoodul Hasan Makhdoom, La Grange, GA (US)

(72) Inventor: Masoodul Hasan Makhdoom, La Grange, GA (US)

(*) Notice: Subject to any disclaimer, the term of this patent is extended or adjusted under 35 U.S.C. 154(b) by 0 days.

(21) Appl. No.: 17/206,316

(22) Filed: Mar. 19, 2021

(65) Prior Publication Data

US 2021/0291725 A1    Sep. 23, 2021

Related U.S. Application Data

(60) Provisional application No. 62/992,015, filed on Mar. 19, 2020.

(51) Int. Cl.
| B60Q 1/34 | (2006.01) |
| B60Q 1/36 | (2006.01) |
| B60W 50/14 | (2020.01) |
| B60K 37/02 | (2006.01) |
| B60R 22/48 | (2006.01) |

(52) U.S. Cl.
CPC ............... B60Q 1/36 (2013.01); B60K 37/02 (2013.01); B60R 22/48 (2013.01); B60W 50/14 (2013.01); *B60R 2022/4816* (2013.01); *B60R 2022/4866* (2013.01)

(58) Field of Classification Search
None
See application file for complete search history.

(56) References Cited

U.S. PATENT DOCUMENTS

| 1,627,545 A | 5/1927 | Meyrowitz |
| 1,675,075 A | 6/1928 | Williamson |
| 1,815,614 A | 7/1931 | Doner |
| 2,521,304 A | 9/1950 | North |
| 2,704,360 A | 3/1955 | Werstein |
| 2,896,190 A | 7/1959 | Galloro |
| 3,074,055 A | 1/1963 | Rudolph |
| 3,309,697 A | 3/1967 | Skrbina |
| 3,504,336 A | 3/1970 | Boblitz |
| 3,845,289 A | 10/1974 | French |
| 3,875,556 A | 4/1975 | Beaird |
| 6,028,537 A * | 2/2000 | Suman ............... B60K 35/00 340/988 |
| 6,215,395 B1 * | 4/2001 | Slaughter ............ B60R 22/48 340/461 |

(Continued)

FOREIGN PATENT DOCUMENTS

FR    2839287 A1    11/2003

*Primary Examiner* — Brent Swarthout
(74) *Attorney, Agent, or Firm* — Richard C. Piercy; Grell & Watson Patent Attorneys LLC

(57) ABSTRACT

A vehicle safety system comprising a series of lights. One set of lights in a prominent turn indicator device indicates to the driver in a more prominent way whether the driver has indicated a turn. The turn indicator lights are either heads-up on a windshield, visible to the driver atop the dashboard or on an interior vehicle pillar, and away from vehicle instrument clusters. Another set of lights on a seatbelt compliance light device indicate to motorists external to the vehicle whether one or more occupants of a vehicle is in seatbelt. Each light system can be used to improve both the safety of the driver, pedestrians, surrounding vehicles, and vehicle occupants.

20 Claims, 5 Drawing Sheets

(56) References Cited

U.S. PATENT DOCUMENTS

| | | | |
|---|---|---|---|
| 6,304,175 B1 * | 10/2001 | Patrick | B60Q 5/00 |
| | | | 340/474 |
| 6,422,728 B1 | 7/2002 | Riggin | |
| 6,424,255 B1 * | 7/2002 | Shanahan | B62J 6/056 |
| | | | 340/475 |
| 7,812,716 B1 * | 10/2010 | Cotter | B60R 22/48 |
| | | | 340/468 |
| 7,860,626 B2 | 12/2010 | Breed | |
| 8,126,645 B2 * | 2/2012 | Hsu | G01C 21/3632 |
| | | | 701/457 |
| 8,686,922 B2 | 4/2014 | Breed | |
| 9,047,703 B2 | 6/2015 | Beckwith et al. | |
| 9,315,146 B2 | 4/2016 | Purks et al. | |
| 2005/0117364 A1 | 6/2005 | Rennick et al. | |
| 2007/0182534 A1 | 8/2007 | Gregory | |
| 2010/0079072 A1 | 4/2010 | Sakaguchi | |
| 2016/0185282 A1 * | 6/2016 | Smith | B60Q 1/38 |
| | | | 340/474 |
| 2017/0120813 A1 * | 5/2017 | Wilson | B60Q 9/00 |
| 2017/0186308 A1 * | 6/2017 | Aplin | G08B 21/0261 |
| 2017/0310816 A1 * | 10/2017 | Rhyne | H04W 4/48 |
| 2019/0255989 A1 * | 8/2019 | Rowell | G06V 20/597 |
| 2019/0277471 A1 * | 9/2019 | Christian | B60Q 1/0035 |

* cited by examiner

AUTOMOBILE SAFETY LIGHT SYSTEM AND METHODS OF USE

CROSS-REFERENCE TO RELATED APPLICATIONS

To the full extent permitted by law, the present U.S. Non-Provisional Patent Application hereby claims priority to and the full benefit of, U.S. Provisional Application No. 62/992,015, filed on Mar. 19, 2020, entitled "AUTOMOBILE SAFETY LIGHTS," which is incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE DISCLOSURE

Technical Field of the Disclosure

The instant disclosure relates to vehicles, namely illuminated indicators. More particularly, the instant disclosure relates to the manufacture and installation of lights within the interior of a vehicle which illuminate to alert the driver and drivers of other vehicles to situations which may impact safety.

Description of the Related Art

Improvements in roadway and motor vehicle designs have steadily reduced injury and death rates in all first world countries. Nevertheless, auto collisions are the leading cause of injury-related deaths, an estimated total of 1.2 million in 2004, or 25% of the total from all causes. In the United States, it is estimated that anywhere from 10% to one-third of all accidents are caused by lane changes. Though it may be difficult to determine, based on a variety of factors involved in each accident, persistent indication after a turn and/or lane change or failure to indicate a lane change or turn may be causal or contributory to many of these lane change accidents. In the United States, more than 20,000 drivers and passengers of motor vehicles die in vehicle accidents. Many years, much more than half of those deaths are individuals who were not wearing a seat belt during the accident that killed them, despite only approximately 10% of vehicle occupants who are estimated to consistently not wear a restraint.

Distracted driving is often named as a leading cause to auto accidents. Distractions come in many forms, including but not limited to smartphone use, failure to use hands-free devices during telephone conversations, distractions among vehicle occupants or from passengers, vehicle cabin electronics, the like and/or combinations thereof. A recent study conducted by the Society of Automotive Engineers, showed that nearly 2 million accidents a year are caused by drivers' failure to properly use a turn signal. Modern vehicle instrument clusters usually include information to the driver relevant to the operation of the vehicle. Among these are several gauges including but not limited to a speedometer, odometer, tachometer, oil pressure gauge, fuel gauge, engine temperature gauge, battery charge meter, as well as various indicators for system malfunctions and warnings. Instrument clusters provide drivers with a centralized and easily viewable location for displaying all critical system information. However, with so much information always displayed to a driver, turn indicators may become lost in the shuffle. This sometimes leads drivers to persistently indicate a turn or lane change, long after a turn or lane change. Even though many vehicle systems have been introduced over the years to prevent this negligent behavior, drivers continue to drive miles without turning of a persistent indicator, leading those drivers around them to perceive they may be entering a lane that they have no intention of entering. This may be further aggravated by other things such as vehicle distractions (as covered above), distance from the instrument cluster (visually) from the visual observation of the road, difficulty in hearing or ease in ignoring audible indicators of turns signals, lack of a feature to automatically turn off a signal indicator after a given period of time (e.g., after 1 minute), incorrect and/or incompatible wheel and seat configuration which may block indicator view from driver, hearing or visual impairment of the driver, the like and/or combinations thereof. With these issues in mind, solutions to address these issues include, but are not limited to, louder audible indicators, brighter instrument cluster lights, two-stage turn indicators (e.g., slight push on blinker switch/stem for lane change, bigger push on turns), and automatic turn-off functions either after a turn or after a given period of time. Still, drivers commonly fail to turn off their turn indication lights.

Seat belt indicators in modern vehicle interiors have been employed in the automotive field for indicating compliance with governmental requirements that each occupant wears their seat belt when occupying a moving vehicle. These indicators are often both visual and audible. A driver of a vehicle may be alerted by an audible chime or a visual light, usually blinking, when a seatbelt of the driver or the passenger is not latched. These systems usually pair a weight sensor detecting occupancy in passenger seats, but usually do not require a sensor in the driver's seat as driver occupancy is assumed during movement. Some systems presently in use may even interlock electrically the ignition and transmission systems with the seat belt to prevent vehicle operation or activate audio and visual alarms as a result of noncompliance which alarms may be seen and/or heard by the driver of the vehicle. The driver then may correct the issue, as it relates to the driver's belt, or ask a vehicle occupant to latch their own seat belt, or alternatively, may assist the occupant in so doing.

Seat belt laws are effective in reducing car crash deaths. Mandatory-seatbelt laws have been shown to reduce traffic fatalities by 8% and serious traffic-related injuries by 9%, respectively. Primary-seatbelt laws seem to be more effective at reducing crash deaths than secondary laws. U.S. seat belt laws may be subject to primary enforcement or secondary enforcement. Primary enforcement allows a peace officer to stop and ticket a driver if they observe a violation. Thirty-four states, the District of Columbia, American Samoa, Guam, the Northern Mariana Islands, Puerto Rico and the U.S. Virgin Islands have primary enforcement laws for front seats. Secondary enforcement means that a peace officer may only stop or cite a driver for a seat belt violation if the driver committed another primary violation (such as speeding, running a stop sign, etc.) at the same time. New Hampshire is the only U.S. state that does not by law require adult drivers to wear safety belts while operating a motor vehicle. Though some states lack primary legal enforcement mechanisms to require all vehicle occupants wear seatbelts, all states in the United States of America, and many if not most jurisdictions globally, require minors to be belted during transit in a passenger automotive vehicle. A majority of jurisdictions in the United States further require that all drivers and front passengers be belted during transit, even if they do not have primary enforcement mechanisms (i.e., secondary enforcement where drivers may be cited for not wearing a seatbelt when another infraction occurs). Furthermore, in jurisdictions where rear seat adult occupants are not required to be belted during transit of a passenger vehicle, many of those jurisdictions do require minor occupants be belted at all times. Fines for infractions usually vary widely, but are commonly very affordable, despite the danger involved to vehicles, their passengers, and surrounding persons if non-compliance should occur during an accident. Rarely, are scenarios of accidents such that any occupant could have advance notice to buckle in time to avoid injury to themselves or others.

In present systems, regardless of secondary or primary enforcement mechanisms available to law enforcement, it is usually difficult if not impossible for a police officer or other monitor external of the vehicle to easily ascertain the number of occupants within the car, and those occupants, which have or have not complied with seat belt wearing requirements. This may be especially true when vehicles use tinting films on vehicle glass, whether or not such tinting films are allowable by state and federal laws and regulations. Additionally, even in jurisdictions where routine seat belt check programs are instituted, and road blocks and/or checkpoints are used to ensure all drivers and passengers are belted during passage through the road block and/or checkpoint, a visual inspection of the interior of the vehicle may be required, complicating and slowing down traffic during this process.

Therefore, it is readily apparent that there is a recognized unmet need for an automobile safety light system for use in passenger vehicles that both better alerts drivers to the indication of a turn and better alerts traffic monitors, including police, to the compliance with seat belt laws and regulations. The instant disclosure is designed to address this need through a system and methods of use, which includes the automotive safety light system disclosed herein while addressing at least some of the aspects of the problems discussed above.

SUMMARY

Briefly described, in a possibly preferred embodiment, the present disclosure overcomes the above-mentioned disadvantages and meets the recognized need for such an automotive safety light system by providing a more visible and prominent turn indicator display in view of a driver and a seatbelt compliance light in view of observers outside a vehicle. The systems two parts may be used individually or in combination to assist in increasing motor vehicle safety, encourage compliance with state motor vehicle laws and regulations, and providing a mechanism for enforcement without interfering with the flow of traffic.

More specifically, the example embodiments of the present automotive safety light system may comprise an aftermarket, built-in, Original Equipment Manufacturer (OEM) standard, or even mandated system of lights which could include the prominent turn indicator and seatbelt compliance light. The prominent turn indicator is preferably in view of the driver and separate from its common location on the instrument cluster of a vehicle. Though this may mean it could be located in many locations, preferable locations which may be easily adapted to vehicles lacking such a prominent turn indicator may include but are not limited to the dashboard above the instrument cluster, the center of the dashboard or the A-pillar between the vehicle windshield and driver-side window. The seatbelt compliance light is preferably easily visible outside the vehicle from an at least one side but may be visible from the front, the rear, the driver-side, or the passenger-side of the vehicle and/or combinations thereof.

In an exemplary embodiment, the automotive safety light system operably engages the existing systems of vehicles including but not limited to those systems which control, monitor, sense, and detect input from the driver (e.g., signal switch), presence of passengers (e.g., seat weight sensors), steering wheel position(s), steering wheel movement(s), seatbelt engagement, passenger weight, the like and/or combinations thereof.

The simplest means of operable engagement may be by adapting a wiring harness and/or splicing into existing electronic and/or electrical systems which monitor and/or control these displays, sensors, lights, etc. Additional means for operably engaging the automobile safety light system may include near-field wireless connection, Bluetooth, on board vehicle diagnostic systems connected to other wireless technologies, the like and/or combinations thereof. It is contemplated herein that removal of an instrument cluster turn indication light may be possible should installation of a prominent turn indicator occur during vehicle manufacture and/or retrofitting.

In some select embodiments, the seatbelt compliance light may be illuminated when all passengers and operators present in the vehicle are in proper compliance with seatbelt requirements. In other select embodiments, the seatbelt compliance light may be extinguished when all passengers and operators present in the vehicle are in proper compliance with seatbelt requirements. It should be understood that variations among vehicle manufacturers and/or aftermarket accessory manufacturers may pose issues as to whether or what the illumination of the seatbelt compliance light means about the compliance status of vehicle occupants. It should be agreed upon and/or mandated that one or the other of these select embodiments are chosen, though the automotive safety light system of the disclosure is not so limited to one of the two selected embodiments. However, since the illumination or non-illumination of a light may indicate something other than compliance (e.g., the light may be malfunctioning or dead), it may be preferable that a requirement be instituted for the installation of the seatbelt compliance light, then illumination indicating compliance could easily be determined because non-illumination may indicate non-compliance with either the use of seatbelts or the functionality of the seatbelt compliance light, if required. This is similar to brake lights indicating a brake has been applied, and the malfunctioning of brake lights would then indicate non-compliance with regulations which require functioning brake lights. Alternatively, to these select embodiments, a variety of colors could be used to indicate total compliance, limited or partial compliance, or lack of compliance. By way of example and not limitation, green may indicate total compliance, yellow may indicate limited and/or partial compliance (e.g., a passenger detected but is unbelted, but a driver is belted), and red may indicate a total lack of compliance. Variations thereof, as understood by those skilled in the art, may be implemented to offer even more additional information, such as a blinking or flashing light if a minor passenger is detected and unbelted.

In select embodiments, the prominent turn indicator may include additional features which may provide additional benefits to the driver of the vehicle. These may include features which make the prominent turn indicator even more prominent as the signal continues to indicate a lane change or turn. For instance, and by way of example and not limitation, prominent turn indicator may include a speaker capable of producing an audible chime, alarm, or other audible alert. This alert may increase in volume over the speaker over a period of time to make more prominent the prominent turn indicator. Another example may include increasing the brightness of the prominent turn indicator over a similar period of time. Yet other examples may include but are not limited to spoken word audible alerts (e.g., "Your signal is still on"), written word visible alerts (e.g., "Still turning?"), the like and/or combinations thereof. These audible alerts may occur immediately upon indication of a turn, after a period of time (e.g., after five seconds), or may vary in volume, tone, frequency, or content over a period of time. While not a prominent feature of the disclosure, haptic feedback upon the driver could further augment the prominent turn indicator. By way of example and not limitation, this may include vibration of the steering wheel, vibration of the seat, the like and/or combinations thereof.

These and other features of the automobile safety lights system and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The automobile safety light system and methods of use will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1-6, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples. It should be noted that the term vehicle may be used herein as a descriptor for any motorized means of transportation. The term light, as used herein, shall mean any electronic device capable of illuminating.

Figure 1:
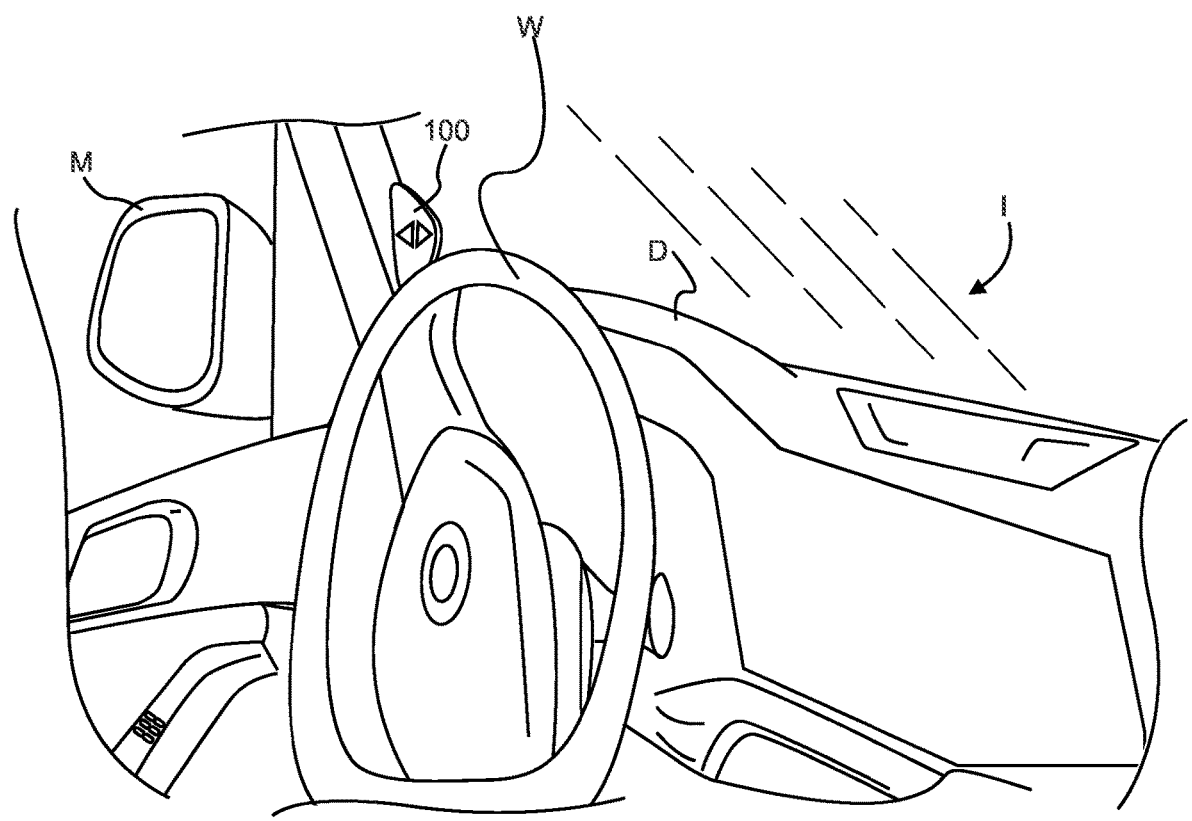
FIG. 1 is a perspective view of a vehicle interior featuring one embodiment of the prominent turn indicator of the automobile safety light system.
Figure 2:
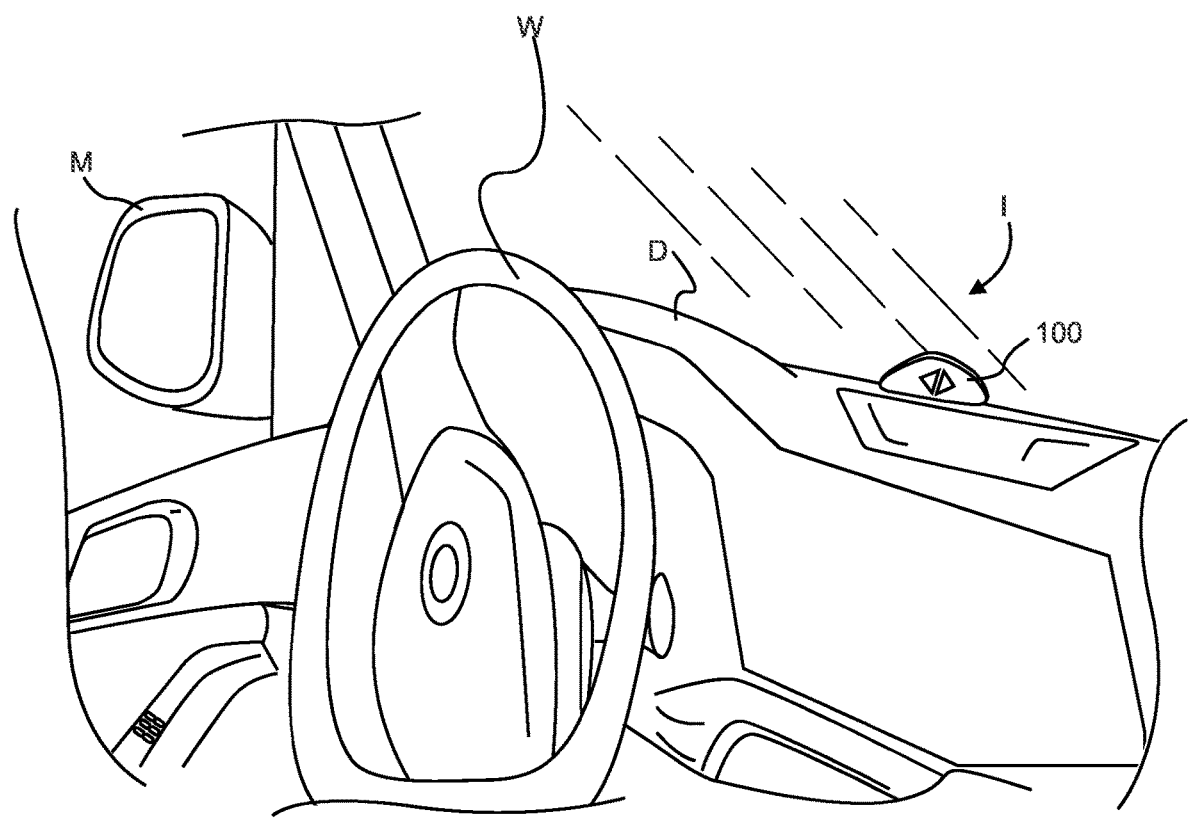
FIG. 2 is a perspective view of a vehicle interior featuring another embodiment of the prominent turn indicator of the automobile safety light system.
Figure 3:
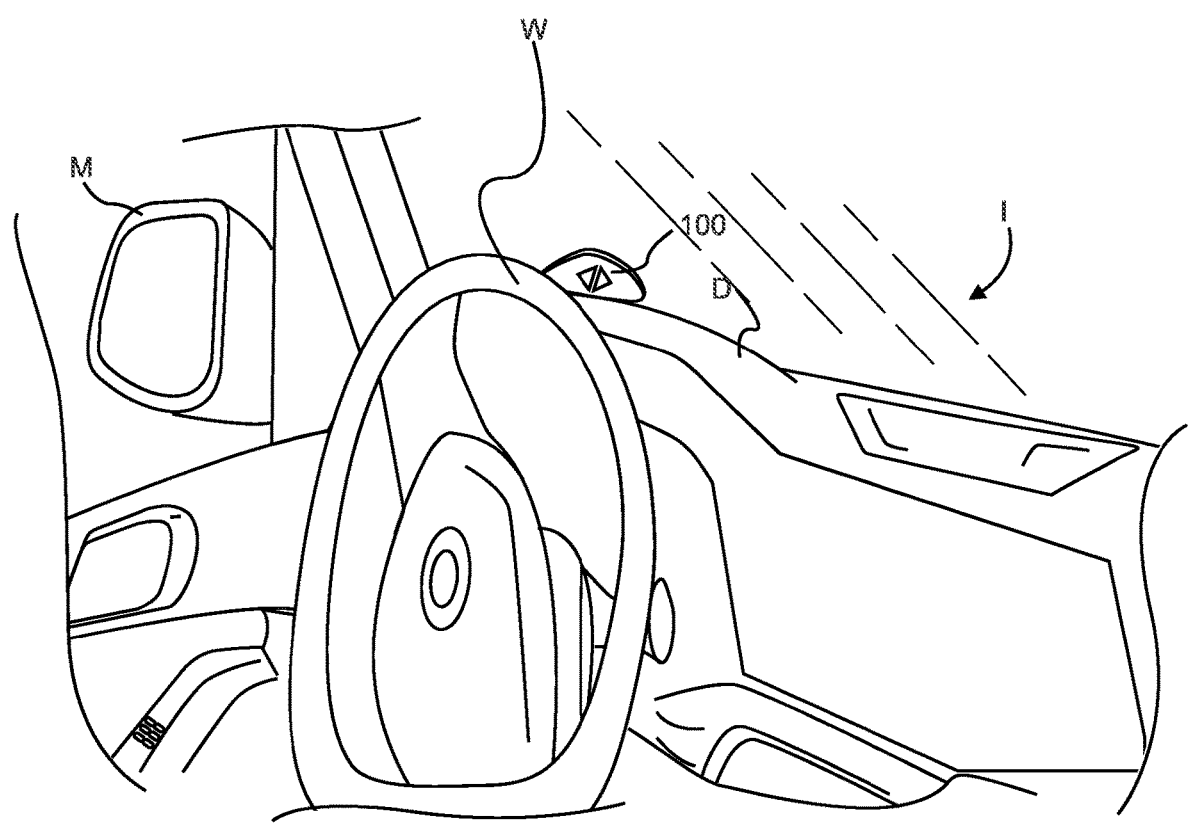
FIG. 3 is a perspective view of a vehicle interior featuring yet another embodiment of the prominent turn indicator of the automobile safety light system.

Referring now to FIGS. 1-3 by way of example, and not limitation, therein are illustrated example embodiments of prominent turn indicator 100 of automobile safety light system installed therein interior I of vehicle V. The automobile safety light system may be referred to herein as the safety light system, the safety lights, or simply the system. Prominent turn indicator 100 of the system may be understood simply as the interiorly visible component of the system. Though not shown in FIGS. 1-3, seatbelt compliance light 200 may be installed thereon the windshield for visibility from the front of vehicle V. Although vehicle V is shown in FIGS. 1-3 as a left-hand drive vehicle, the disclosure is not so limited, and the system of the disclosure may be used on any configuration of any vehicle. In some embodiments, prominent turn indicator 100 of the automobile safety light system is installed thereon a pillar of vehicle V. See FIG. 1. In other embodiments, In some embodiments, prominent turn indicator 100 of the automobile safety light system is installed thereon various locations of dashboard D of vehicle V. See FIGS. 2-3.

Figure 4:
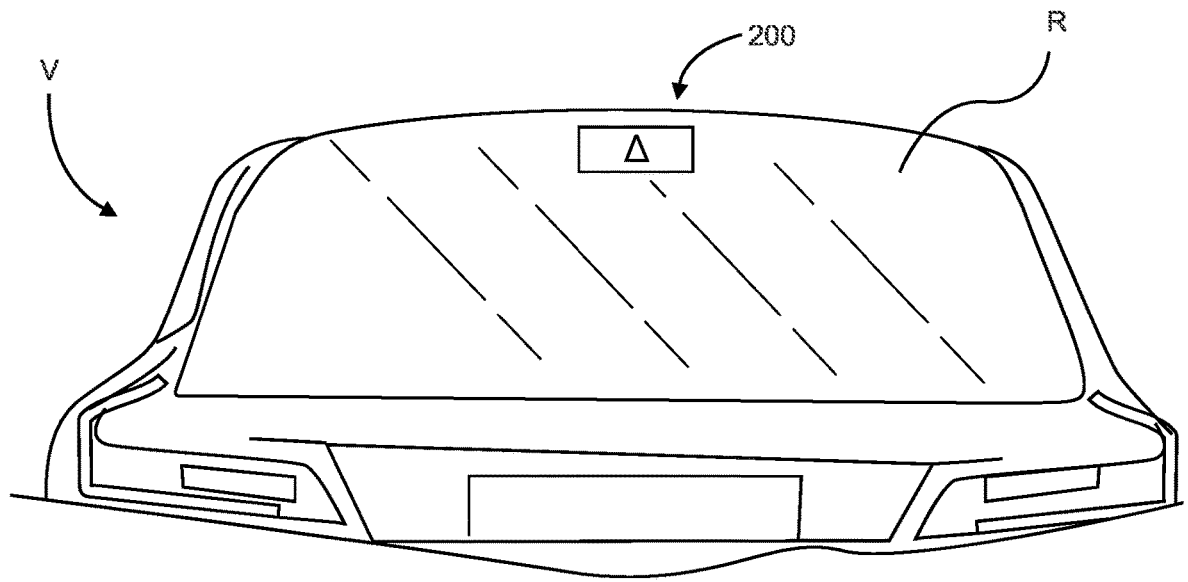
FIG. 4 is a rear elevational view of a vehicle featuring one embodiment of the seatbelt compliance light of the automobile safety light system.
Figure 5:
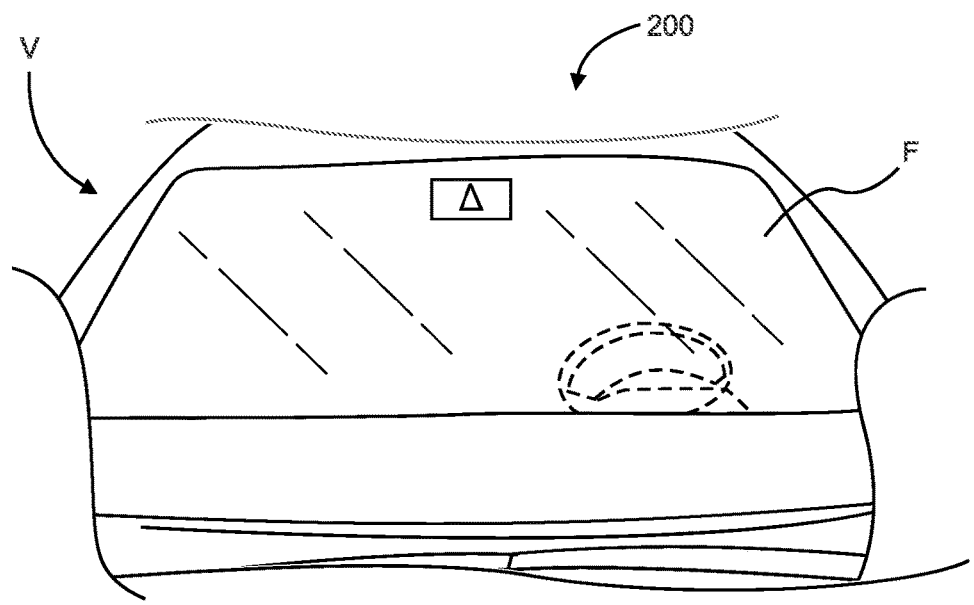
FIG. 5 is a front elevational view of a vehicle featuring one embodiment of the seatbelt compliance light of the automobile safety light system.

Referring instead to FIGS. 4-5, by way of example and not limitation, therein are illustrated example embodiments of seatbelt compliance light 200 installed thereon front F and/or rear R of vehicle V. seatbelt compliance light 200 of the system may be understood simply as the exteriorly visible component of the system. Though not shown in FIGS. 4-5, prominent turn indicator 100 may be installed therein interior I in view of FIGS. 4 and/or 5 so as to be visible from the exterior of vehicle V from front F or rear R. Although vehicle V is shown in the FIGS. 4-5 as a left-hand drive vehicle, the disclosure is not so limited, and the system of the disclosure may be used on any configuration of any vehicle. As show in FIGS. 4-5, seatbelt compliance light 200 may be triangularly shaped, but the disclosure is not so limited. Seatbelt compliance light 200 of the system may also include other shapes, including but not limited to circles, ovals, 4 or more sided polygons, the like and/or combinations thereof and/or rounded-corner versions of these and the like. In select embodiments of the system, seatbelt compliance light 200 may be illuminated when all passengers and operators present in the vehicle are in proper compliance with seatbelt requirements. In other select embodiments, seatbelt compliance light 200 may be extinguished when all passengers and operators present in the vehicle are in proper compliance with seatbelt requirements. A detector, as is commonly found in modern vehicles, may be installed or manufactured within the seatbelt latch mechanism so as to monitor a status of the seatbelt latch (i.e., determining whether one or more seatbelts are latched). It should be understood that variations among vehicle manufacturers and/or aftermarket accessory manufacturers may pose issues as to whether or what the illumination of seatbelt compliance light 200 means about the compliance status of vehicle occupants. It may be advisable that an agreed upon and/or mandated choice as to one or the other of these select embodiments are chosen, though the automotive safety light system of the disclosure is not so limited to one of the two selected embodiments. However, since the illumination or non-illumination of seatbelt compliance light 200 may indicate something other than compliance (e.g., the light may be malfunctioning or dead), it may be preferable that a requirement be instituted for the installation of seatbelt compliance light 200, then illumination indicating compliance could easily be determined because non-illumination may indicate non-compliance with either the use of seatbelts or the functionality of seatbelt compliance light 200, if required. Alternatively, to these select embodiments, a variety of colors could be used to illuminate seatbelt compliance light 200 and to indicate total compliance, limited or partial compliance, or lack of compliance. By way of example and not limitation, green light of seatbelt compliance light 200 may indicate total compliance, yellow light of seatbelt compliance light 200 may indicate limited and/or partial compliance (e.g., a passenger detected but is unbelted, but a driver is belted), and red light of seatbelt compliance light 200 may indicate a total lack of compliance. While colors are not limited in this disclosure, they may include by way of other examples red, orange, yellow, green, blue, indigo, violet/purple, white. Blends, combinations, and variations thereof, as understood by those skilled in the art, may be implemented to offer even more additional information, such as a blinking or flashing of seatbelt compliance light 200 if a minor passenger is detected and unbelted.

Referring now more specifically to FIG. 1, illustrated therein is a perspective view of vehicle V having interior I featuring one embodiment of prominent turn indicator 100 of the automobile safety light system. A driver, positioned and seated just behind wheel W may have in view, during operation of vehicle V, side mirror M, steering wheel W, dashboard D, the windshield, the instrument cluster behind steering wheel W, and importantly, prominent turn indicator 100 of the system. In this embodiment, prominent turn indicator 100 of the system may be installed thereon a pillar of interior I of vehicle V. As is the case of this drawing, prominent turn indicator 100 may be installed mid-way up the A-pillar of interior I of vehicle V so as to be prominently visible to the driver. Prominent turn indicator 100 may be operable engaged with existing systems of vehicle V so as to blink or otherwise activate during indication of a turn or may be installed during the manufacture of vehicle V. By way of example and not limitation, the circuitry for existing lights may be linked or wired with prominent turn indicator 100 so as to illuminate it or blink it during indication of a turn. One skilled in the art may disassemble from the column of wheel W, the stem, switch or lever which is used to indicate a turn. By using a test light, or prominent turn indicator 100, and splicing into various wires found in the disassembled stem, switch or lever, one skilled in the art could test one or more of the wires therein to confirm which is activated when a left turn is indicated, when a right turn is indicated, then permanently or detachably install prominent turn indicator 100 so as to activate along with a counterpart within the instrument cluster and/or exterior indicator light. This could be repeated for the second arrow light (e.g., right first, then left, or vice versa). Alternatively, a low-powered remote operated sensor could be installed into the wiring in a similar fashion which could operably interact with prominent turn indicator 100 to illuminate a right arrow or left arrow when appropriate through wireless communication or other known means. Prominent turn indicator 100 may be powered from existing power sources within the vehicle or may be powered using photovoltaic solar cells and/or batteries. Finally, a gyroscopic, accelerometer, or similar sensor may be installed on the stem, switch, or lever to detect when a turn has been indicated, which may then communicate such status to prominent turn indicator 100, thereby activating and illuminating the appropriate light.

Referring now more specifically to FIG. 2, illustrated therein is a perspective view of vehicle V having interior I featuring another embodiment of prominent turn indicator 100 of the automobile safety light system. A driver, positioned and seated just behind wheel W may have in view, during operation of vehicle V, side mirror M, steering wheel W, dashboard D, the windshield, the instrument cluster behind steering wheel W, and importantly, prominent turn indicator 100 of the system. In this embodiment, prominent turn indicator 100 of the system may be installed thereon dashboard D of interior I of vehicle V. As is the case of this drawing, prominent turn indicator 100 may be installed at or near the center of dashboard D of interior I of vehicle V so as to be prominently visible to the driver. Prominent turn indicator 100 may be operable engaged with existing systems of vehicle V so as to blink or otherwise activate during indication of a turn or may be installed during the manufacture of vehicle V. By way of example and not limitation, the circuitry for existing lights may be linked or wired with prominent turn indicator 100 so as to illuminate it or blink it during indication of a turn. One skilled in the art may disassemble from the column of wheel W, the stem, switch or lever which is used to indicate a turn. By using a test light, or prominent turn indicator 100, and splicing into various wires found in the disassembled stem, switch or lever, one skilled in the art could test one or more of the wires therein to confirm which is activated when a left turn is indicated, when a right turn is indicated, then permanently or detachably install prominent turn indicator 100 so as to activate along with a counterpart within the instrument cluster and/or exterior indicator light. This could be repeated for the second arrow light (e.g., right first, then left, or vice versa). Alternatively, a low-powered remote operated sensor could be installed into the wiring in a similar fashion which could operably interact with prominent turn indicator 100 to illuminate a right arrow or left arrow when appropriate through wireless communication or other known means. Prominent turn indicator 100 may be powered from existing power sources within the vehicle or may be powered using photovoltaic solar cells and/or batteries. Finally, a gyroscopic, accelerometer, or similar sensor may be installed on the stem, switch, or lever to detect when a turn has been indicated, which may then communicate such status to prominent turn indicator 100, thereby activating and illuminating the appropriate light.

Referring now more specifically to FIG. 3, illustrated therein is a perspective view of a vehicle interior featuring yet another embodiment of prominent turn indicator 100 of the automobile safety light system. A driver, positioned and seated just behind wheel W may have in view, during operation of vehicle V, side mirror M, steering wheel W, dashboard D, the windshield, the instrument cluster behind steering wheel W, and importantly, prominent turn indicator 100 of the system. In this embodiment, prominent turn indicator 100 of the system may be installed thereon dashboard D of interior I of vehicle V. As is the case of this drawing, prominent turn indicator 100 may be installed at or near the center of the driver's side of dashboard D of interior I of vehicle V so as to be prominently visible to the driver.

Prominent turn indicator 100 may be operable engaged with existing systems of vehicle V so as to blink or otherwise activate during indication of a turn or may be installed during the manufacture of vehicle V. By way of example and not limitation, the circuitry for existing lights may be linked or wired with prominent turn indicator 100 so as to illuminate it or blink it during indication of a turn. One skilled in the art may disassemble from the column of wheel W, the stem, switch or lever which is used to indicate a turn. By using a test light, or prominent turn indicator 100, and splicing into various wires found in the disassembled stem, switch or lever, one skilled in the art could test one or more of the wires therein to confirm which is activated when a left turn is indicated, when a right turn is indicated, then permanently or detachably install prominent turn indicator 100 so as to activate along with a counterpart within the instrument cluster and/or exterior indicator light. This could be repeated for the second arrow light (e.g., right first, then left, or vice versa). Alternatively, a low-powered remote operated sensor could be installed into the wiring in a similar fashion which could operably interact with prominent turn indicator 100 to illuminate a right arrow or left arrow when appropriate through wireless communication or other known means. Prominent turn indicator 100 may be powered from existing power sources within the vehicle or may be powered using photovoltaic solar cells and/or batteries. Finally, a gyroscopic, accelerometer, or similar sensor may be installed on the stem, switch, or lever to detect when a turn has been indicated, which may then communicate such status to prominent turn indicator 100, thereby activating and illuminating the appropriate light.

Referring now more specifically to FIG. 4, illustrated therein is a partial rear elevational view of vehicle V featuring one embodiment of seatbelt compliance light 200 of the automobile safety light system. Vehicle V having rear R may have installed thereon the rear windshield seatbelt compliance light 200. Seatbelt compliance light 200 may be installed thereon the interior or the exterior of vehicle V rear windshield. It is further contemplated herein that the glass of the rear windshield may have seatbelt compliance light 200 integrated therein to its structure during manufacture. Preferably, within interior I of vehicle V may be a plurality of sensors indicating whether or not occupants are seated among a plurality of passenger seats. Also, preferably, within interior I of vehicle V may be a plurality of sensors indicating whether or not a plurality of seatbelts corresponding with the plurality of passenger seats are latched, thereby securing the plurality of passengers. A simple computerized device may be required in order to match, logically, whether a seatbelt should be latched. For instance, in the case of a driver, a front passenger and one rear passenger in vehicle V having, by way of example and not limitation, 2 front and 3 rear seats, activated sensors corresponding to the driver, the front passenger and the one rear passenger would require each of those seats to have engaged and latched seatbelts in order to display compliance with seatbelt laws on seatbelt compliance light 200.

Referring now more specifically to FIG. 5, illustrated therein is a partial front elevational view of vehicle V featuring one embodiment of seatbelt compliance light 200 of the automobile safety light system. Vehicle V having front F may have installed thereon the front windshield seatbelt compliance light 200. Seatbelt compliance light 200 may be installed thereon the interior or the exterior of vehicle V front windshield. It is further contemplated herein that the glass of the front windshield may have seatbelt compliance light 200 integrated therein to its structure during manufacture. Preferably, within interior I of vehicle V may be a plurality of sensors indicating whether or not occupants are seated among a plurality of passenger seats. Also, preferably, within interior I of vehicle V may be a plurality of sensors indicating whether or not a plurality of seatbelts corresponding with the plurality of passenger seats are latched, thereby securing the plurality of passengers. A simple computerized device may be required in order to match, logically, whether a seatbelt should be latched. For instance, in the case of a driver, a front passenger and one rear passenger in vehicle V having, by way of example and not limitation, 2 front and 3 rear seats, activated sensors corresponding to the driver, the front passenger and the one rear passenger would require each of those seats to have engaged and latched seatbelts in order to display compliance with seatbelt laws on seatbelt compliance light 200.

Figure 6:
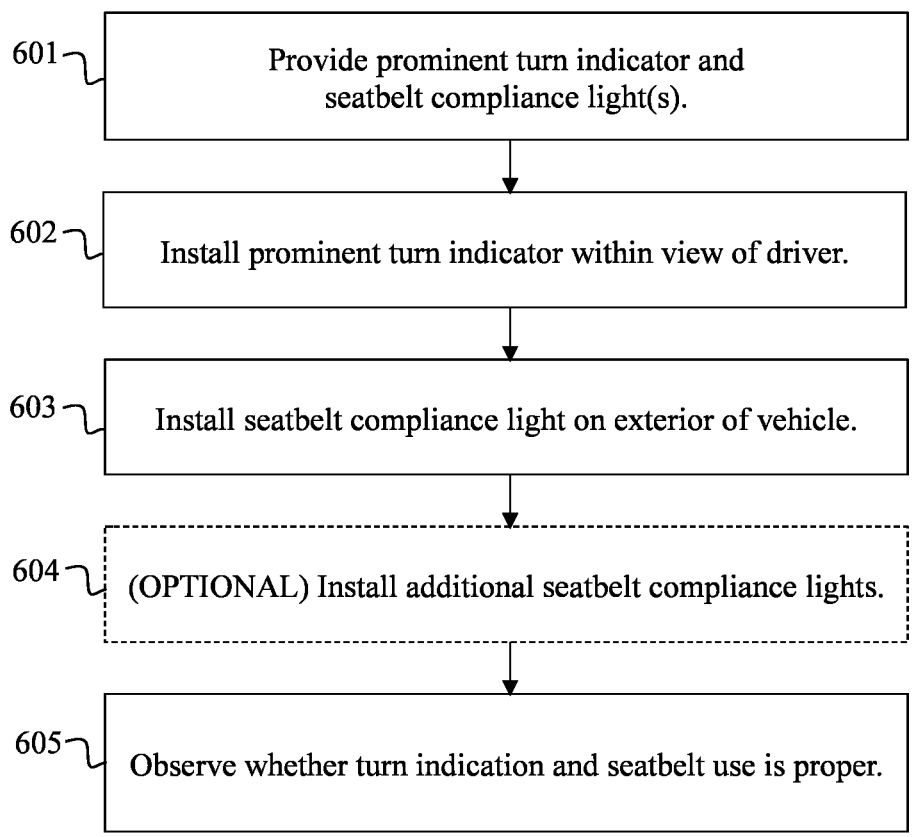
FIG. 6 is a flow chart of an exemplary methods of use of the automobile safety light system.

Referring now more specifically to FIG. 6, illustrated therein is a flow chart of an exemplary method of use of the automobile safety light system. At first method step 601, prominent turn indicator 100 and seatbelt compliance light 200 may be provided. At second method step 602, prominent turn indicator 100 may be installed in interior I of vehicle V within view of the driver. This may occur as drawn in FIGS. 1-3 and the corresponding descriptions, or variations therein described. At third method step 603, seatbelt compliance light 200 may be installed on interior or exterior of vehicle V in view of those external to vehicle V. This may occur as drawn in FIGS. 4-5 and the corresponding descriptions, and variations therein described. At fourth method step 604, which is optional, additional equipment may be added in the same form and manner as seatbelt compliance light 200 so as to make visible seatbelt compliance light 200 from various positions surround vehicle V. Finally, at fifth method step 605, the driver, passengers, and those exterior vehicle V may observe the vehicle during normal operation to determine proper use of turn signal indication and seatbelts according to the status of the light system, including prominent turn indicator 100 and seatbelt compliance light 200. Those making such observations may take corresponding action including but not limited to, deactivating an errant signal indication, warning the driver and/or passengers of seatbelt non-compliance, citing the driver and/or passengers for seatbelt non-compliance, the like and/or combinations thereof.

It is contemplated herein that certain benefits, including increased safety, decreased frustration from surround drivers, increased flow of traffic during seatbelt checkpoints, and other benefits may be conferred the system of the disclosure become largely and widely available and/or mandatory vehicle equipment. However, an owner of vehicle V may not wish to indicate to those monitoring and/or policing bodies they may be visible to the status of seatbelt usages by themselves and their passengers by way of seatbelt compliance light 200. Legal requirements for such lights may be required in order to facilitate adoption. Given that seatbelts are life-saving devices and vehicle accident fatalities could be drastically reduced through universal seatbelt adoption, legal requirements for such seatbelt compliance light 200 to be installed in existing and/or included in original equipment in new vehicles may greatly reduce such fatalities. Furthermore, since most vehicles do not have any instrumentation, displays, etc. installed thereon dashboard D or separate from an instrument panel, installation of prominent turn indicator 100 within view of the driver, yet separated from clustering of visual information may provide certain benefits to the driver with regard to decreasing errant signaling, especially in the case of visually impaired and/or elderly drivers.

It is further contemplated herein that the system may include a variety of overall sizes and corresponding sizes for and of various parts, including but not limited to: prominent turn indicator 100, a housing of prominent turn indicator 100, seatbelt compliance light 200, a housing of seatbelt compliance light 200, wiring harnesses, wireless communication components (e.g. Bluetooth, WIFI, etc.), power delivery systems, connections to existing equipment, the like and/or combinations thereof. Furthermore, it is contemplated that due to variations in vehicles, including but not limited to makes, models, manufacturers, product lines, import vs. export versions, the like and combinations thereof, that a variety of considerations may be considered in regard to placement of the lights and integration with existing on-board vehicle systems and/or computers. Yet still, though herein is contemplated one method of a heads-up display having prominent turn indicator 100, an A-pillar or dashboard light, and a front/rear seatbelt compliance light 200, other means have been contemplated and the description is not so limited. Various trade-offs may be considered when selecting the technology best to deploy in a given vehicle. These include limiting the labor involved during installation, keeping the devices in a field of vision of the driver, and allowing the indicator to be visible from outside the vehicle without obstructing visibility during nighttime driving. It is also contemplated that certain considerations and/or additional features of the present disclosure may improve the functionality. These may include communication with other devices via a network, the device may communicate via any known or yet to be discovered protocol, including wired networking, fiber optic communication, wireless networking (i.e. WiFi), near field communication (e.g. Bluetooth® or NFC), the like or combinations thereof. The system of the disclosure, including its various parts and subsystems, may receive power from an outlet designed for consumer or commercial electronics, the existing power system of a vehicle by "tying in", or may contain a battery which may or may not have the capability to re-charge.

With respect to the above description then, it is to be realized that the optimum dimensional relationships of the disclosed system, to include variations in size, materials, shape, form, position, function and manner of operation, assembly, type of luminous device (LED, Incandescent, Halogen, etc.), shape of light (arrow, triangle, round or square, etc.) and use, are intended to be encompassed by the present disclosure.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. A system for prominently displaying a status of an at least one seatbelt use to an external observer of a vehicle and a status of a turn signal indication to a driver of the vehicle while in the vehicle comprising:
    a plurality of vehicle seats, each having an occupancy sensor and a seatbelt proximate to each of said plurality of vehicle seats, the seatbelt having a detector capable of determining whether the seatbelt is latched;
    a turn signal switch capable of illuminating a prominent turn indicator light;
    the prominent turn indicator light installed in a location within view of the driver; and
    a seatbelt compliance light, wherein an illumination of said seatbelt compliance light indicates to said external observer whether each of said plurality of vehicle seats having said occupancy sensor activated simultaneously has said detector of said seatbelt in a latched state;
    wherein the prominent turn indicator light illuminates at a greater intensity after the turn signal switch was activated for a period greater than five seconds.

2. The system of claim 1, wherein the location within view of the driver is an at least one location from a group of locations, the group of locations consisting of a vehicle interior A-pillar, a center of a vehicle dashboard, a driver field of view center on said vehicle dashboard, and a front windshield.

3. The system of claim 1, wherein the seatbelt compliance light is installed on an at least one location visible from an exterior of the vehicle, the at least one location from a group of locations, the group of locations comprising a front windshield, a rear windshield, a driver side window, and a passenger side window.

4. The system of claim 1, wherein the prominent turn indicator light further comprises a speaker capable of producing an audible indication.

5. The system of claim 4, wherein the speaker produces a spoken word indication that a turn is indicated.

6. The system of claim 5, wherein the speaker produces the spoken word indication after the turn signal switch was activated for a period of greater than five seconds.

7. The system of claim 4, wherein the speaker produces said audible indication at a greater intensity after the turn signal switch was activated for a period greater than five seconds.

8. The system of claim 1, wherein the prominent turn indicator light is capable of blinking, and is further capable of blinking at a greater frequency after the turn signal switch was activated for a period greater than five seconds.

9. The system of claim 3, wherein said prominent turn indicator light and said seatbelt compliance light illuminate in an at least one color, said at least one color from a group of colors the group of colors consisting of red, orange, yellow, green, blue, indigo, violet, and white.

10. The system of claim 9, wherein an illuminated color of said seatbelt compliance light communicates an at least one seatbelt compliance status, the at least one seatbelt compliance status from a group of compliance statuses, the group of seatbelt compliance status consisting of an all occupants belted status, a some occupants unbelted status, a minor passenger unbelted status, and an all occupants unbelted status.

11. The system of claim 10, wherein said seatbelt compliance light flashes when said at least one compliance status indicates a vehicle occupant is unbelted.

12. A method of increasing a visibility of an indication of a turn to a driver of a vehicle and displaying whether seatbelt compliance is occurring within a vehicle to an observer of the vehicle, the vehicle comprising at least a plurality of vehicle seats, each having an occupancy sensor and a seatbelt proximate to each of said plurality of vehicle seats, the seatbelt having a detector capable of determining whether the seatbelt is latched and a turn signal switch, the method comprising:
- providing a safety light system, the safety light system comprising at least a prominent turn indicator light and a seatbelt compliance light;
  - installing the prominent turn indicator light in a location within view of the driver;
- installing the seatbelt compliance light, wherein an illumination of said seatbelt compliance light indicates to said external observer whether each of said plurality of vehicle seats having said occupancy sensor activated simultaneously has said detector of said seatbelt in a latched state;
- the driver observing whether an errant signal is indicated on the prominent turn indicator light; and
- the observer observing whether a seatbelt compliance is maintained within the vehicle;
- wherein the prominent turn indicator light is configured to illuminate at a greater intensity after the turn signal switch was activated for a period greater than five seconds.

13. The method of claim 12, further comprising a step of providing a seatbelt compliance light and a step of placing a plurality of additional seatbelt compliance lights visible to an exterior of said vehicle.

14. The method of claim 12, wherein the location within view of the driver is an at least one location from a group of locations, the group of locations consisting of a vehicle interior A-pillar, a center of a vehicle dashboard, a driver field of view center on said vehicle dashboard, and a front windshield.

15. The method of claim 13, wherein the seatbelt compliance light is installed on an at least one location visible from an exterior of the vehicle, the at least one location from a group of locations, the group of locations comprising a front windshield, a rear windshield, a driver side window, and a passenger side window.

16. The method of claim 12, wherein the prominent turn indicator light further comprises a speaker capable of producing an audible indication.

17. The method of claim 16, wherein the speaker produces a spoken word indication that a turn is indicated.

18. The method of claim 17, wherein the speaker produces the spoken word indication after the turn signal switch was activated for a period of greater than five seconds.

19. The method of claim 16, wherein the speaker produces said audible indication at a greater volume after the turn signal switch was activated for a period greater than five seconds.

20. The method of claim 12, wherein the prominent turn indicator light is configured to blink at a greater frequency after a period greater than five seconds.

* * * * *